(12) United States Patent
Tsai (10) Patent No.: US 8,392,492 B2
(45) Date of Patent: Mar. 5, 2013

(54) SINE/COSINE VALUE GENERATION APPARATUS

(75) Inventor: Tien-Ju Tsai, Tainan County (TW)

(73) Assignee: Himax Media Solutions, Inc., Sinshih Township, Tainan County (TW)

( * ) Notice: Subject to any disclaimer, the term of this patent is extended or adjusted under 35 U.S.C. 154(b) by 1082 days.

(21) Appl. No.: 12/355,845

(22) Filed: Jan. 19, 2009

(65) Prior Publication Data
US 2010/0182053 A1 Jul. 22, 2010

(51) Int. Cl.
*G06F 1/02* (2006.01)
(52) U.S. Cl. .................. 708/276; 327/106; 327/129
(58) Field of Classification Search .............. None
See application file for complete search history.

(56) References Cited

U.S. PATENT DOCUMENTS

| | | | | |
|---|---|---|---|---|
| 5,276,633 A | * | 1/1994 | Fox et al. | 708/276 |
| 5,737,253 A | * | 4/1998 | Madisetti et al. | 708/276 |
| 5,774,082 A | * | 6/1998 | Chu et al. | 708/276 |
| 5,954,787 A | * | 9/1999 | Eun | 708/276 |
| 7,031,992 B2 | * | 4/2006 | Khan et al. | 708/276 |
| 7,890,562 B2 | * | 2/2011 | Gross et al. | 708/276 |
| 2009/0300088 A1 | * | 12/2009 | Michaels et al. | 708/276 |

\* cited by examiner

*Primary Examiner* — Idriss N Alrobaye
*Assistant Examiner* — Dayton Lewis-Taylor
(74) *Attorney, Agent, or Firm* — McClure, Qualey & Rodack, LLP (57) ABSTRACT

An apparatus for generating sine/cosine values of an input phase is disclosed. The apparatus includes a phase projector, an LUT-arithmetic unit, a temp sine/cosine generator and a sine/cosine value generator. The phase projector maps the input phase angle into an octant phase and determines an octant index indicating which octant the input phase angle actually locates and a flag indicating whether or not the input phase happens to be pi/4, 3\*pi/4, 5\*pi/4 or 7\*pi/4. The LUT-arithmetic unit receives the octant phase for provision of its corresponding sine/cosine values. The temp sine/cosine generator receives the corresponding sine/cosine values of the octant phase for provision of temp sine/cosine values based on the flag. The sine/cosine value generator selectively swaps and inverts the temp sine/cosine values as the sine/cosine values of the input phase based on a swap index derived from the octant index.

9 Claims, 8 Drawing Sheets

SINE/COSINE VALUE GENERATION APPARATUS

BACKGROUND OF THE INVENTION

1. Field of the Invention

The invention relates generally to a sine/cosine value generation apparatus, and more particularly, to a low-cost sine/cosine value generation apparatus utilizing less memory space.

2. Description of the Related Art

In a variety of engineering fields, mathematic calculations are highly required. Among complex mathematic calculations, trigonometric functions are relatively basic but important. Also, for trigonometric functions, sine/cosine functions are the most commonly used functions since a lot of engineering calculations require them as a basis for further calculations. For example, for the communication engineering field, a sine/cosine waveform(s) is often produced for subsequent signal processing.

Figure 1:
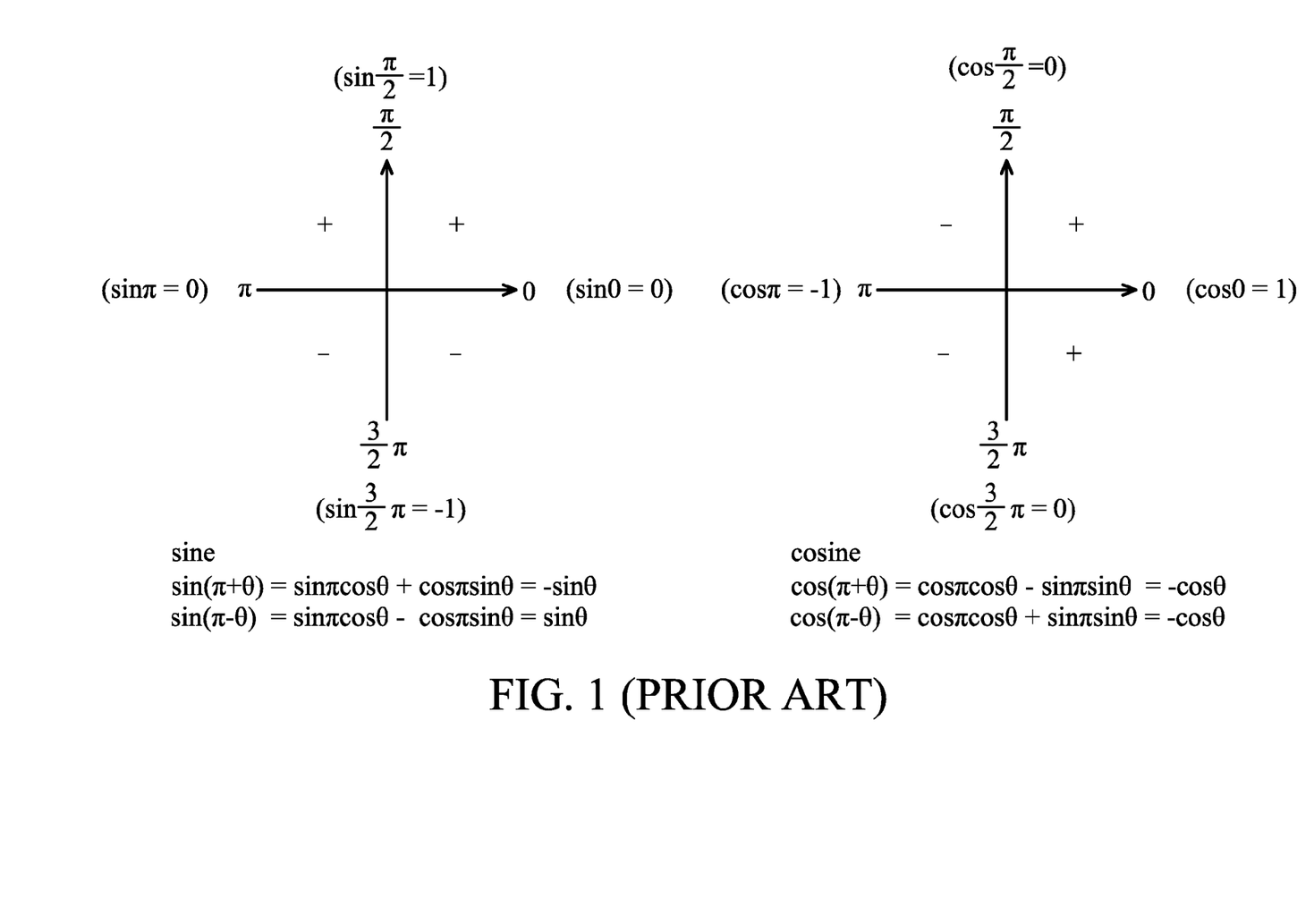
FIG. 1 depicts a characteristic diagram for sine and cosine functions.

According to mathematic definition, a circle is defined as having four quadrants, each with 90 degrees. For conventional sine/cosine generation mechanisms, all of the sine/cosine values in the first quadrant (0 to 90 degrees) are calculated and stored beforehand so that a sine/cosine value of an arbitrary angle ranging from 0 to 360 degrees can be directly obtained; sometimes with a change in sign. For example, FIG. 1 depicts a characteristic diagram for sine and cosine functions. In FIG. 1, it is shown that all of the sine values in the first and second quadrants are positive, whereas all of the cosine values in the first and fourth quadrants are positive. Based on this, if a sine value of an arbitrary angle is to be determined, say 210 degrees, for example, then the angle needs to be mapped into a corresponding angle within the first quadrant for further determination of the sine value. More specifically, through the formula: "$\sin(\pi+\theta)=\sin\pi\cos\theta+\cos\pi\sin\theta$", the angle "210 degrees" can be mapped into "30 degrees" within the first quadrant, but with a sign change in the sine value. Therefore, the final result of "$\sin(210°)$" will be "$-\sin(30°)$". In this manner, only the sine/cosine values within the first quadrant needs to be calculated beforehand, then a sine/cosine value of an arbitrary angle can be directly obtained using angle mapping.

With the sine/cosine values in the first quadrant calculated and stored beforehand, a certain amount of memory space is required, thus limiting memory cost decrease. Therefore, a low-cost sine/cosine value generation apparatus utilizing less memory space is required.

BRIEF SUMMARY OF THE INVENTION

In light of the previously described, the objective of the invention is to provide a low cost sine/cosine value generation apparatus. Unlike the conventional approach that calculates and stores all sine/cosine values in the first quadrant (90 degrees) beforehand, the invention calculates and stores all sine/cosine values in the first octant (45 degrees) only, thus saving required memory space by 50%.

The invention discloses an apparatus for generating sine/cosine values of an input phase. The apparatus comprises a phase projector, an LUT-arithmetic unit, a temp sine/cosine generator and a sine/cosine value generator. The phase projector maps the input phase into an octant phase and determines an octant index indicating which octant the input phase actually locates and a flag indicating whether or not the input phase happens to be pi/4, 3*pi/4, 5*pi/4 or 7*pi/4. The LUT-arithmetic unit receives the octant phase for provision of its corresponding sine/cosine values. The temp sine/cosine generator receives the corresponding sine/cosine values of the octant phase for provision of temp sine/cosine values based on the flag. The sine/cosine value generator selectively swaps or inverts the temp sine/cosine values as the sine/cosine values of the input phase based on a swap index derived from the octant index.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
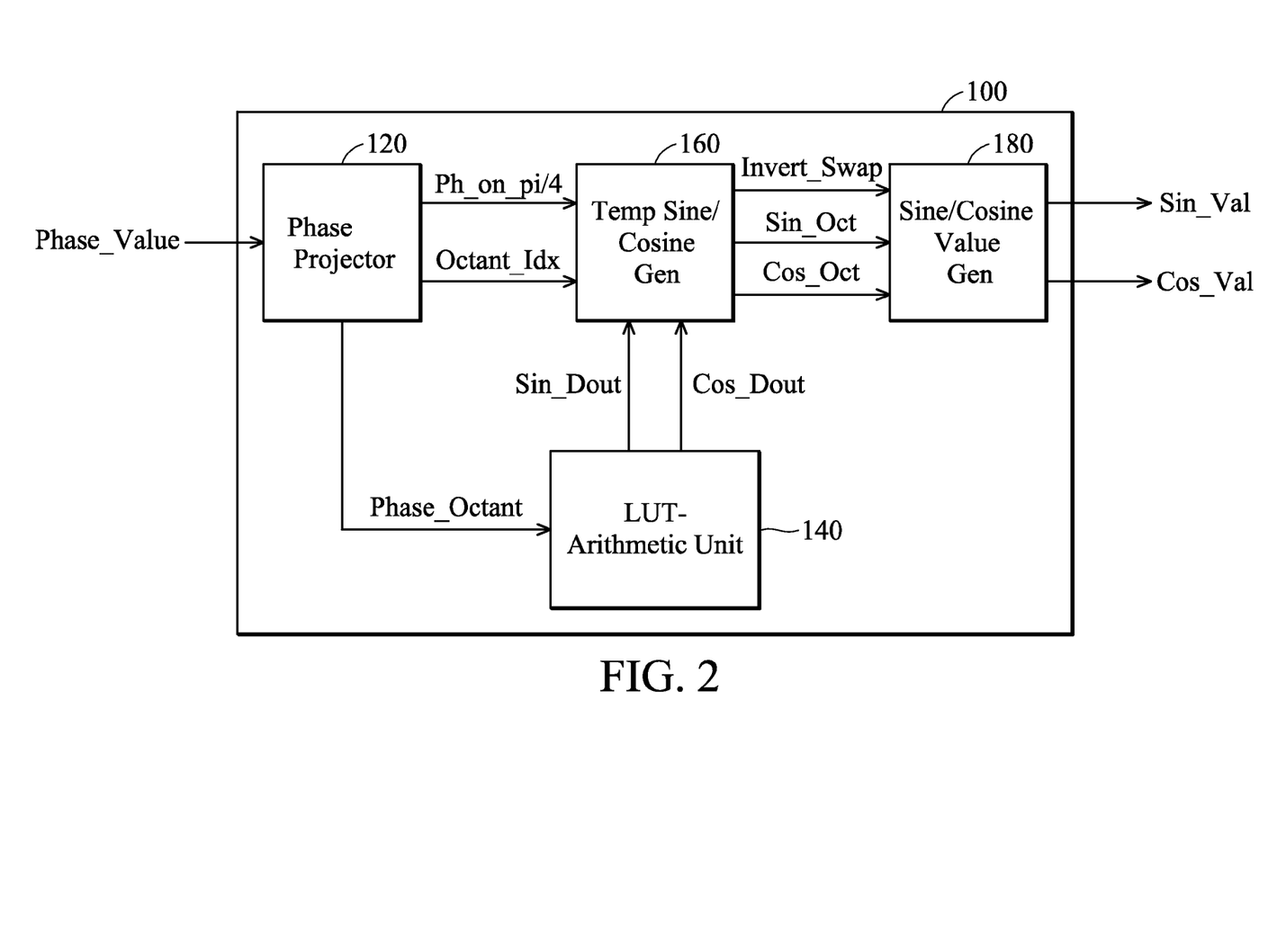
FIG. 2 depicts a block diagram of an embodiment of a trigonometric function value generation apparatus according to the invention.

FIG. 2 depicts a block diagram of an embodiment of a sine/cosine value generation apparatus 100 according to the invention. The sine/cosine value generation apparatus 100 comprises a phase projector 120, an LUT-arithmetic unit 140, a temp sine/cosine generator 160 and a sine/cosine value generator 180. In the FIG. 2, the phase projector 120 receives a phase Phase_Value for generation of an octant phase Phase_Octant, an octant index Octant_Idx and a flag Ph_on_pi/4. The LUT-arithmetic unit 140 receives the octant phase Phase_Octant for provision of the corresponding sine value Sin_Dout and cosine value Cos_Dout. The temp sine/cosine generator 160 receives the sine value Sin_Dout, the cosine value Cos_Dout, the flag Ph_on_pi/4 and the octant index Octant_Idx for generation of a swap index Invert Swap, a temp sine value Sin_Oct and a temp cosine value Cos_Oct. The sine/cosine value generator 180 receives the swap index Invert Swap, the temp sine value Sin_Oct and the temp cosine value Cos_Oct for generation the desired sine value Sin_Val and cosine value Cos_Val. A detailed description of the sine/cosine value generation apparatus 100 will be presented below.

Figure 3:
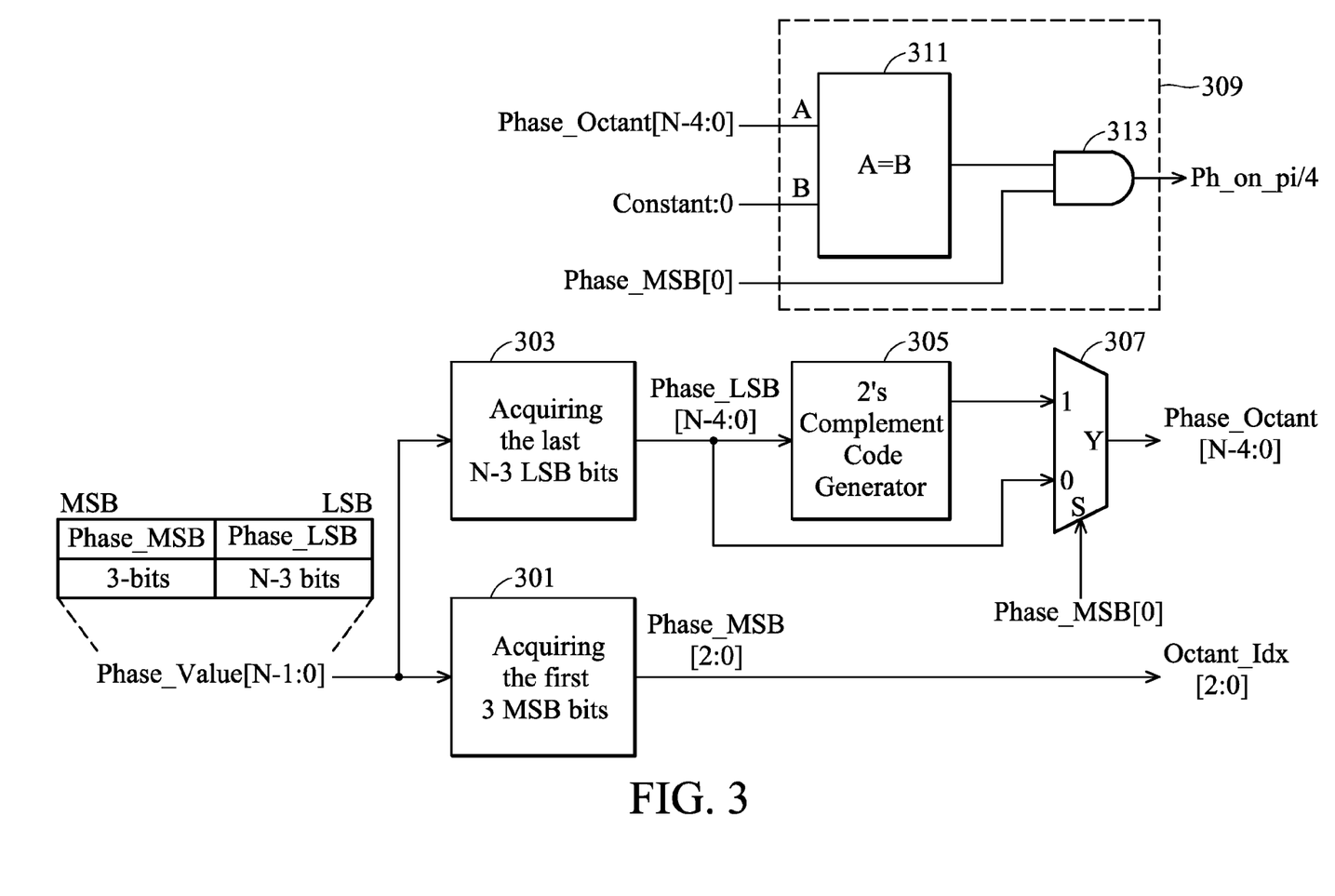
FIG. 3 depicts a block diagram of an embodiment of the phase projector according to the invention.

FIG. 3 depicts a block diagram of an embodiment of the phase projector 120 according to the invention. The phase projector 120 is provided to receive the phase Phase_Value for generation of an octant phase Phase_Octant, an octant index Octant_Idx and a flag Ph_on_pi/4. In the FIG. 3, the received phase Phase_Value is expressed with an N-bit number comprising of two parts. The $1^{st}$ part is the first 3 MSB bits of the N-bit number, that is expressed as Phase_MSB, and the $2^{nd}$ part is the last N-3 LSB bits of the N-bit number, that is expressed as Phase_LSB. In addition, the octant index Octant_Idx is used to indicate which octant the input phase Phase_Value actually locates. In this manner, the phase location of the input phase Phase_Value will be defined based on the octant index Octant_Idx. For example, an input phase Phase_Value within octant 0 would suggest 000 for the octant index Octant_Idx. Similarly, an input phase Phase_Value within octant 7 would suggest 111 for the octant index Octant_Idx. In addition, the flag Ph_on_pi/4 is used to indicate whether or not the input phase Phase_Value happens to be pi/4,3 *pi/4,5 *pi/4 or 7*pi/4. In these cases, incorrect sine/cosine values may be retrieved and special handlings must be taken. Note that the invention maps an arbitrary input phase Phase_Value into an equivalent angle within octant 0 (0 to 45 degrees), such that only the sine/cosine values for octant 0 (0 to 45 degrees) are calculated and/or stored to retrieve the sine/cosine values of the arbitrary angle.

As shown in FIG. 3, the phase projector 120 includes acquiring units 301 and 303, a 2's complement code generator 305, a selector 307, and a logic circuit 309. The acquiring unit 301 acquires the first 3 MSB bits of the phase Phase_Value (Phase _MSB) for output as the octant index Octant_Idx. The acquiring unit 303 acquires the last N-3 LSB bits of the phase Phase_Value (Phase_LSB). The 2'complement code generator 305 finds the 2'complement of the output of the acquiring unit 303. In addition, the selector 307 selects the output of the acquiring unit 303 or the output of the 2's complement code generator 305 as the octant phase Phase_Octant. The selection is made by reference to a control signal Phase_MSB[0] which is the LSB bit of the octant index Phase_MSB. That is, when the control signal Phase_MSB[0] is 1 (i.e. when the input phase Phase_Value is located in octant 1, 3, 5 or 7), the 2's complement of the output of the acquiring unit 303 is output as the octant phase Phase_Octant; when the control signal Phase Phase_MSB[0] is 0 (i.e. when the input phase Phase_Value is located in octants 0, 2, 4 or 6), the output of the acquiring unit 303 is directly output as the octant phase Phase_Octant. Through the use of the acquiring unit 303, the 2's complement code generator 305 and the selector 307, the input phase Phase_Value will be mapped into an equivalent angle within octant 0.

As shown in FIG. 3, the logic circuit 309 receives the octant phase Phase_Octant and the control signal Phase_MSB[0] to generate the flag Ph_on_pi/4. In this example, the logic circuit 309 further includes a comparator 311 and an AND gate 313. The comparator 311 determines whether or not all bits of the octant phase Phase_Octant are logic 0. The AND gate 313 pulls high the flag Ph_on_pi/4 only if the control signal Phase_MSB[0] is logic 1 and the output of the comparator 311 is logic 1. In other words, the logic circuit 309 pulls high the flag Ph_on_pi/4 only if the control signal Phase_MSB[0] is logic 1 and all bits of the octant phase Phase_Octant are logic 0, that is, the flag Ph_on_pi/4 is logic 1 only when the phase Phase_Value is pi/4, 3*pi/4, 5*pi/4 or 7*pi/4.

Figure 4A:
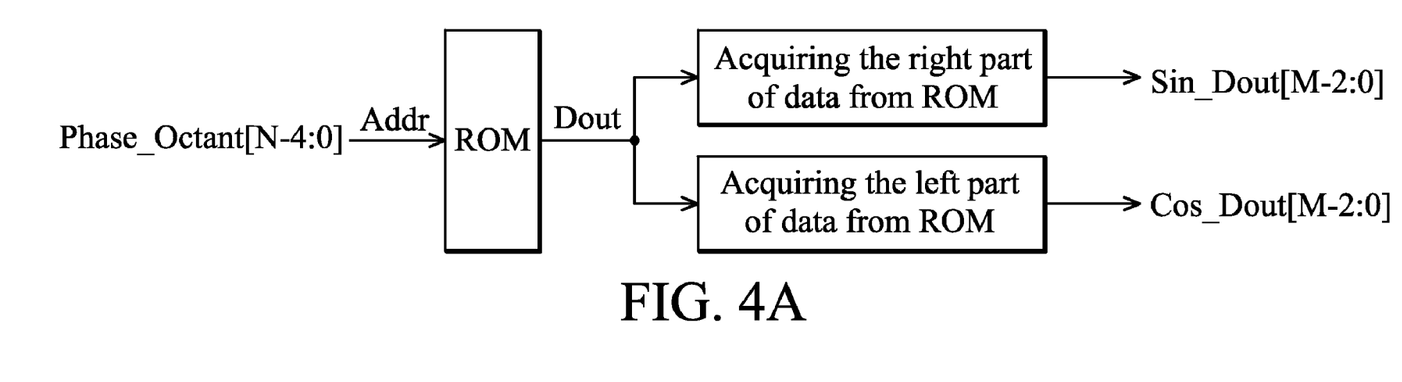
FIG. 4A depicts an embodiment of an LUT-arithmetic unit implemented with a full-LUT approach.
Figure 4B:
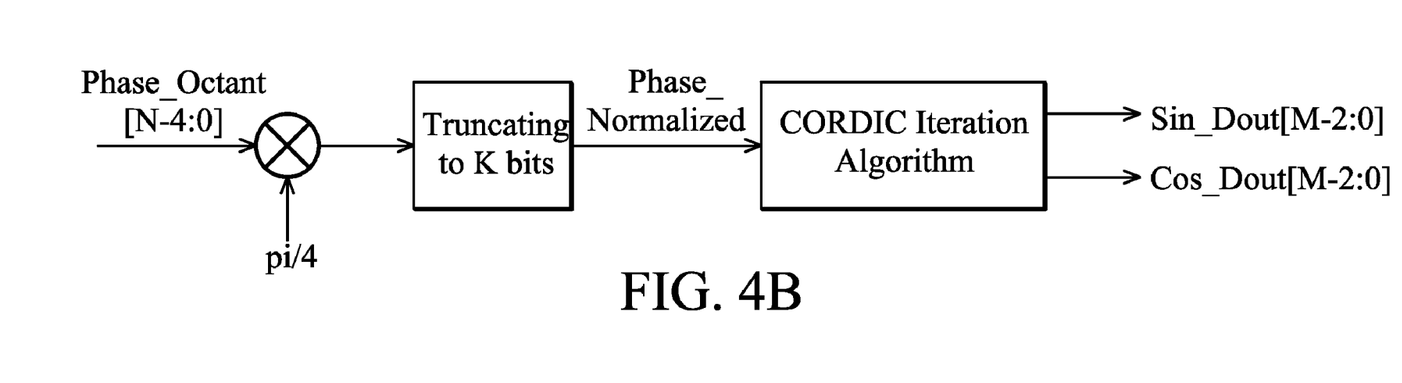
FIG. 4B depicts another embodiment of the LUT-arithmetic unit implemented with a full-arithmetic approach.
Figure 4C:
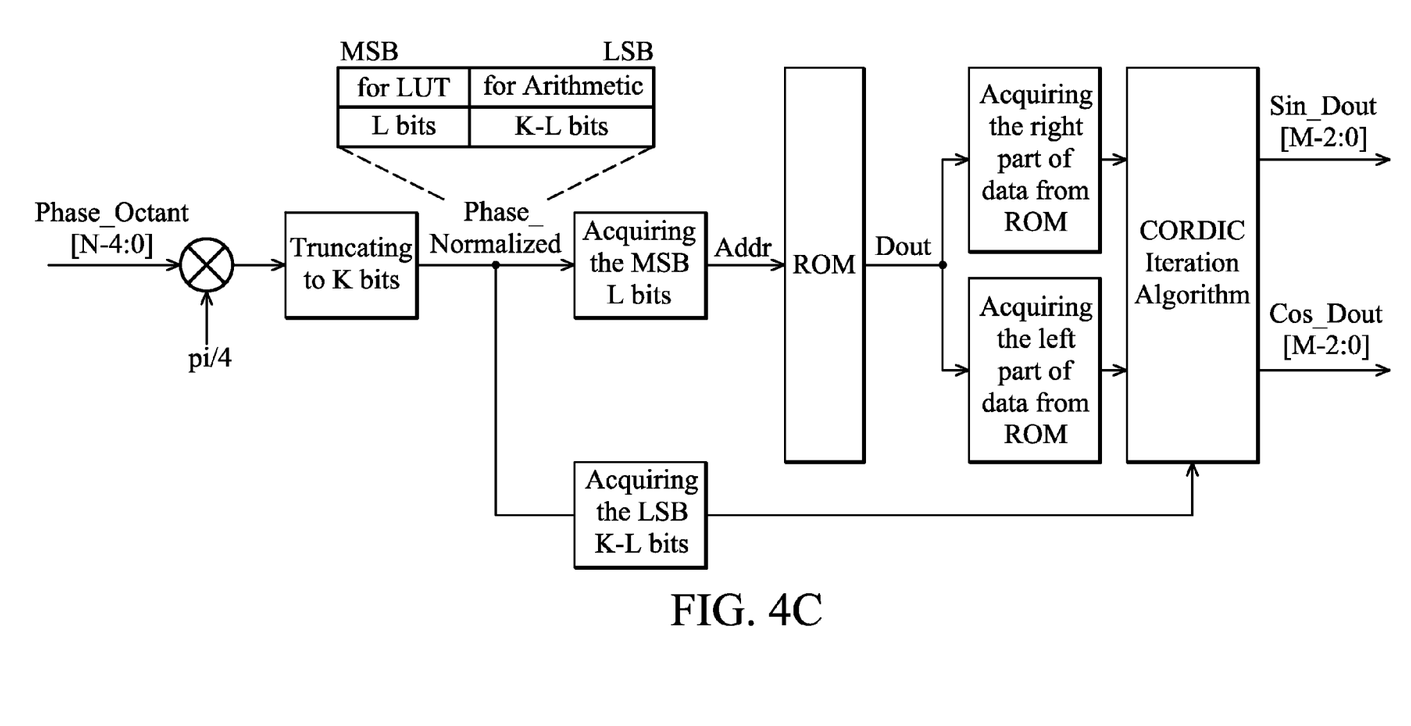
FIG. 4C depicts yet another embodiment of the LUT-arithmetic unit implemented with an LUT-arithmetic hybrid approach.
Figure 4D:
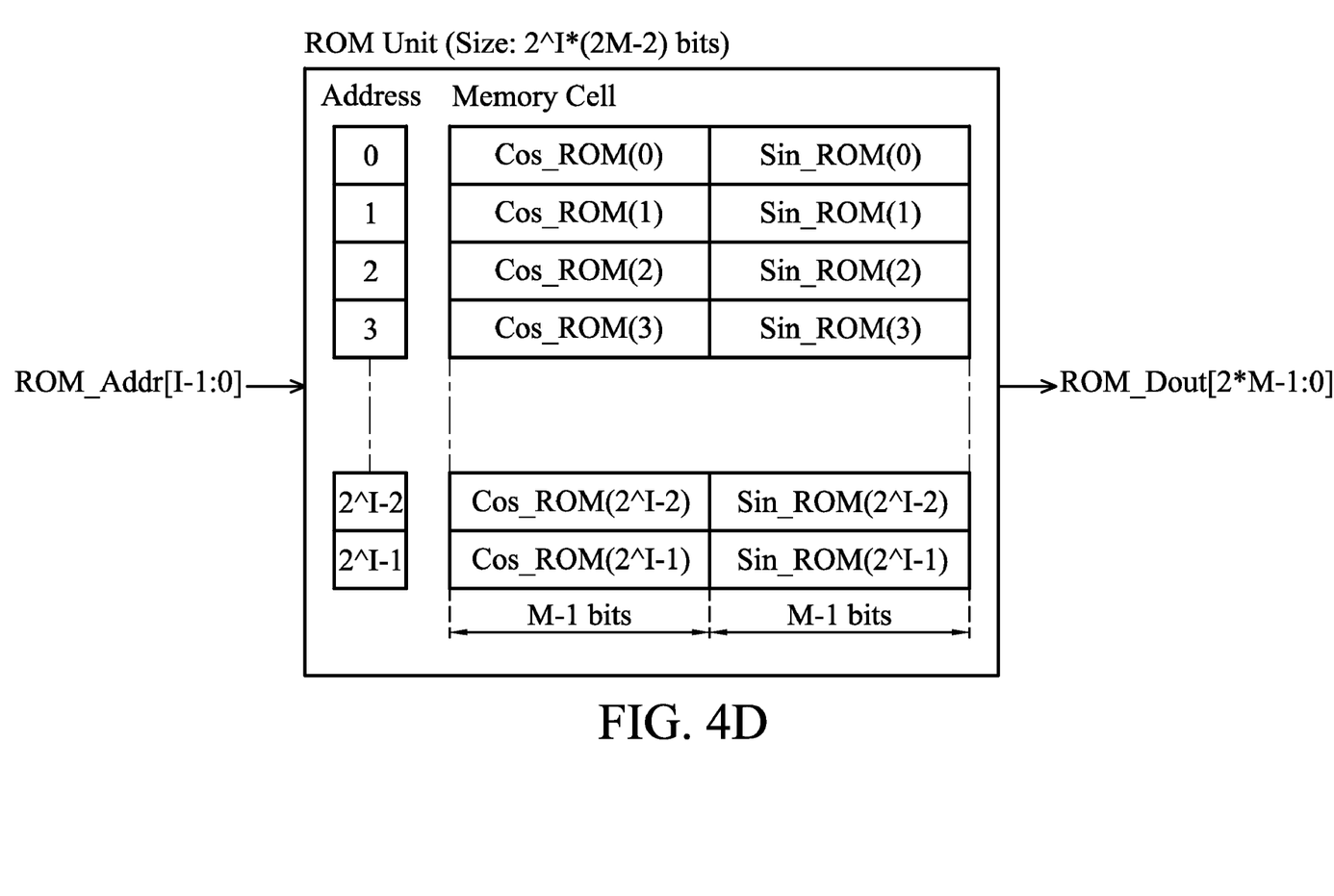
FIG. 4D depicts the stored data format in a ROM.

FIGS. 4A, 4B and 4C show three embodiments of the LUT-arithmetic unit 140 according to the invention. The LUT-arithmetic unit 140 receives the octant phase Phase_Octant for provision of the corresponding sine value Sin_Dout and cosine value Cos_Dout. FIG. 4A shows an embodiment of the LUT-arithmetic unit 140 implemented with a full-LUT approach. In FIG. 4A, all of the sine/cosine values of octant 0 (0 to 45 degrees) are calculated and further stored in a ROM (Read-Only Memory). In response to receiving the octant phase Phase_Octant from the phase projector 120, corresponding sine/cosine values may be retrieved from the ROM in a table look-up manner, and the retrieved values may be output as Sin_Dout and Cos_Dout. FIG. 4B shows another embodiment of the LUT-arithmetic unit 140 implemented with a full-arithmetic approach. In FIG. 4B, all of the sine/cosine values of octant 0 (0 to 45 degrees) are calculated using a processor implementing CORDIC iteration algorithm, and the normalized octant phase Phase_Normalized which may be obtained by multiplying the octant phase Phase_Octant by a constant of pi/4 and truncating the outcome to K bits may have its sine/cosine values calculated using the processor for output as Sin_Dout and Cos_Dout. FIG. 4C shows yet another embodiment of the LUT-arithmetic unit 140 implemented with an LUT-arithmetic hybrid approach. In FIG. 4C, the sine/cosine values of octant 0 (0 to 45 degrees) are stored in the ROM, and the normalized octant phase Phase_Normalized may be obtained by multiplying the octant phase Phase_Octant by a constant of pi/4 and truncating the outcome to K bits. The normalized octant phase Phase_Normalized includes a first part which is the L MSB bits of the normalized octant phase Phase_Normalized and a second part which is the (K-L) LSB bits of the normalized octant phase Phase_Normalized. The sine/cosine values for the first part may be retrieved from the ROM in a table look-up manner. The sine/cosine values for the second part may be calculated by a processor implementing CORDIC iteration algorithm. The outputs of the ROM and the processor implementing CORDIC iteration algorithm may be combined as the signals Sin_Dout and Cos_Dout. In more details, suppose the normalized octant phase Phase_Normalized is expressed as A+B, where A is its first part and B is the second part. Because sin(A+B)=sin A*cos B+cos A*sin B and cos (A+B)=cos A*cos B−sin A*sin B, by finding sin A and cos A in a table look-up manner and by calculating sin B and cos B using a processor implementing CORDIC iteration algorithm, sin(A+B) and cos(A+B) may be combined by the outputs of the ROM and the processor. FIG. 4D shows the stored data format in the ROM. In the FIG. 4D, for example, the cosine values are stored in the left part of the ROM, whereas the sine values are stored in the right part of the ROM.

Figure 5A:
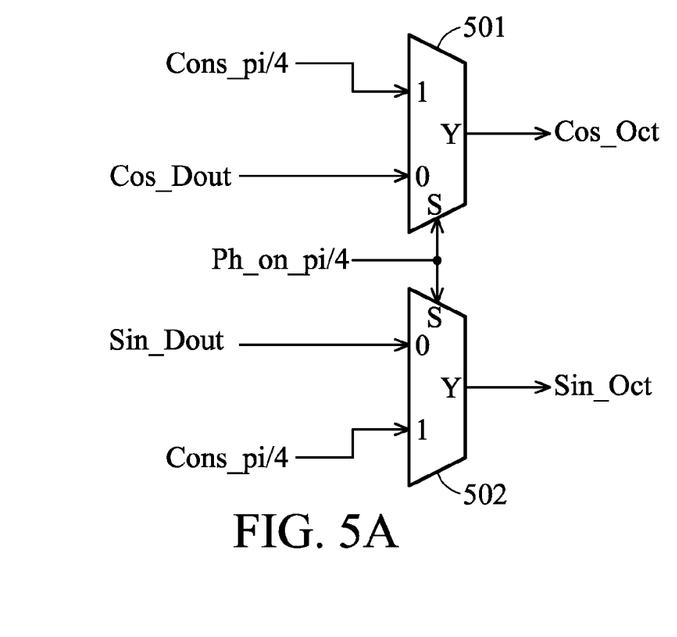
FIG. 5A depicts a generation process of the octant values Sin_Oct and Cos_Oct.
Figure 5B:
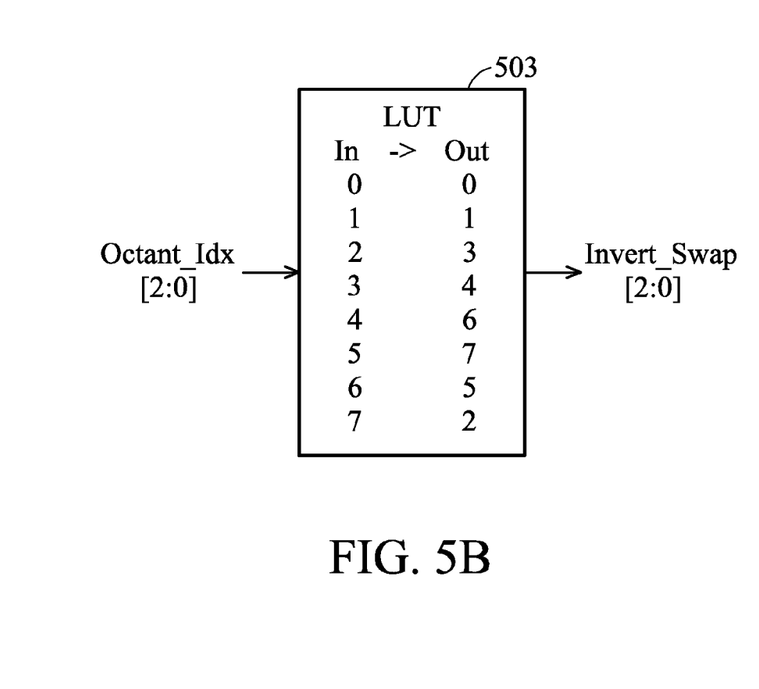
FIG. 5B depicts a look-up table for indexs Octant_Idx and Invert_Swap.

Referring to FIG. 2, the temp sine/cosine generator 160 further includes selectors 501 and 502 and a look-up table (LUT) 503, as shown in FIGS. 5A and 5B. Upon the reception of the sine value Sin_Dout, the cosine value Cos_Dout, the flag Ph_on_pi/4 and the octant index Octant_Idx, the temp sine/cosine generator 160 generates a swap index Invert_Swap, a temp sine value Sin_Oct and a temp cosine value Cos_Oct. Referring to FIG. 5A, the selector 501 selects a constant Cons_pi/4 or the cosine value Cos_Dout as the temp cosine value Cos_Oct. The selector 502 selects the constant Cons_pi/4 or the sine value Sin_Dout as the temp sine value Sin_Oct. The selection of selector 501 and 502 is made by reference to the flag Ph_on_pi/4. In more details, when the input phase Phase_Value is pi/4, 3*pi/4, 5*pi/4 or 7*pi/4, the flag Ph_on_pi/4 will be logic 1, the selectors 501 and 502 make the constant Cons_pi/4 as the output for the temp sine value Sin_Oct and the temp cosine value Cos_Oct simultaneously. On the contrary, the flag Ph_on_pi/4 will be logic 0, the selectors 501 and 502 make the sine value Sin_Dout and the cosine value Cos_Dout as the output for the temp sine value Sin_Oct and the temp cosine value Cos_Oct, respectively.

Referring to FIG. 5B, the look-up table (LUT) 503 has a one-to-one mapping relation between the swap index Invert_Swap and the octant index Octant_Idx. The swap index Invert_Swap and the octant index Octant_Idx are three bits number in this embodiment. Although the look-up table (LUT) 503 is integrated in the temp sine/cosine generator 160 in this embodiment, the look-up table (LUT) 503 may be also integrated in other elements such as the phase projector 120, the LUT-arithmetic unit 140 or the sine/cosine value generator 180. The detailed usage of the swap index Invert_Swap will be explained later.

Figure 6:
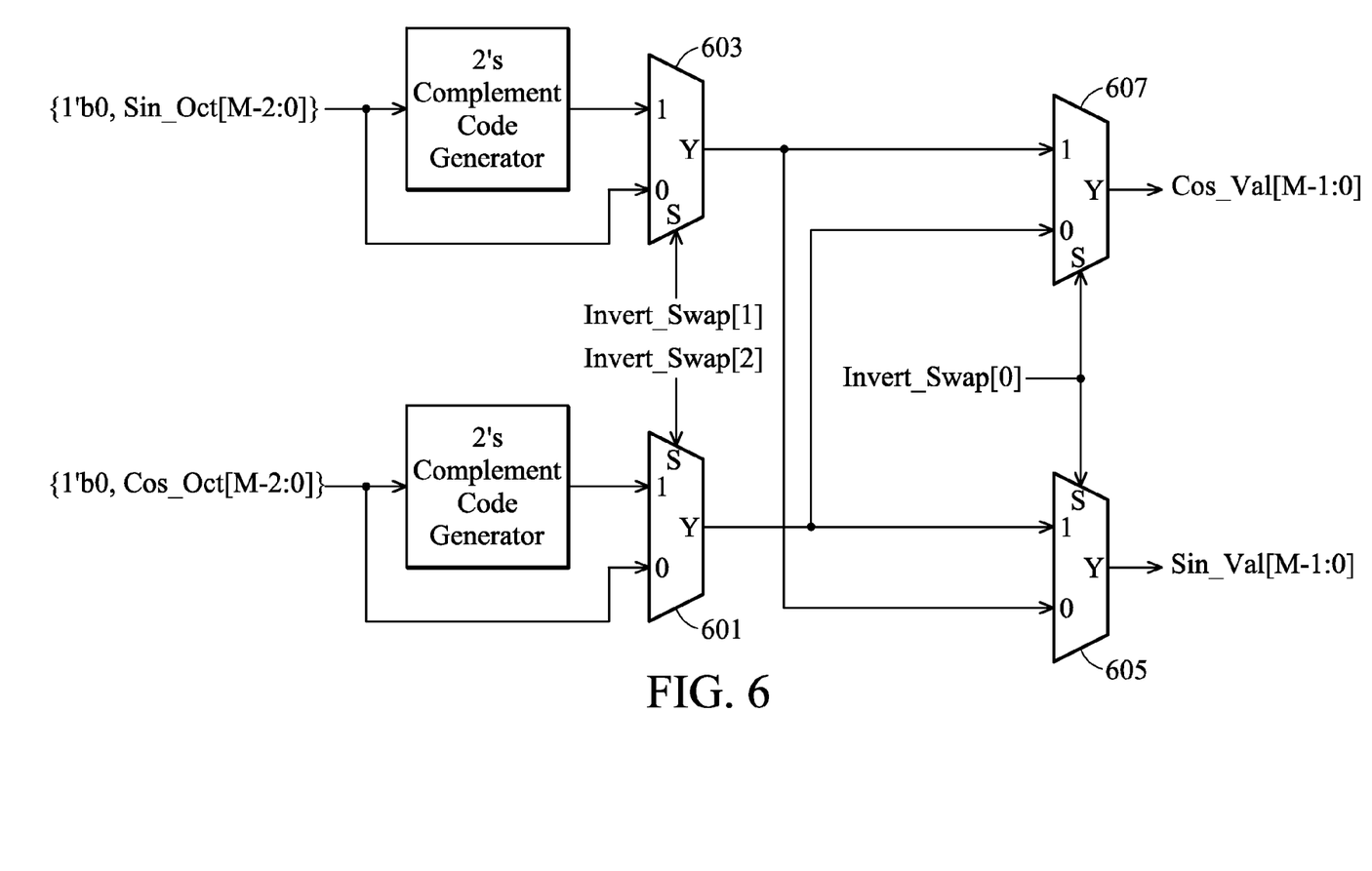
FIG. 6 depicts a generation process of the final values Sin_Val and Cos_Val.

Referring to FIG. 2, upon reception of the swap index Invert_Swap, the temp sine value Sin_Oct and the temp cosine value Cos_Oct, the sine/cosine value generator 180 generates the desired sine value Sin_Val and cosine value Cos_Val. Referring to FIG. 6, the first-level selectors 601 and 603 are used to give a sign for the temp sine value Sin_Oct and the temp cosine value Cos_Oct, and the signed values Sin_Oct and Cos_Oct are further sent to the second-level selectors 605 and 607. The first-level selectors 603 and 601 choose the temp sine/cosine values Sin_Oct and Cos_Oct (positive values) or their 2's complements (negative values) as outputs based on the control signals Invert_Swap[1] and Invert_Swap[2] from the temp sine/cosine generator 160, respectively. The second-level selectors 605 and 607 choose the output of the selector 603 as the desired cosine value Cos_Val and the output of the selector 601 as the desired sine value Sin_Val, or choose the output of the selector 601 as the desired cosine value Cos_Val and the output of the selector 603 as the desired sine value Sin_Val based on the control signal Invert_Swap[0] also from the temp sine/cosine generator 160.

The block diagram of the embodiment of the sine/cosine value generation apparatus 100 has been fully described above.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for generating sine/cosine values of an input phase ranging from 0 to 2*pi and expressed with an N-bit number, comprising:
a phase projector mapping the input phase into an octant phase, and determining a flag indicating whether or not the input phase happens to be pi/4, 3*pi/4, 5*pi/4 or 7*pi/4;
an LUT-arithmetic unit receiving the octant phase for provision of its corresponding sine/cosine values;
a temp sine/cosine generator receiving the corresponding sine/cosine values of the octant phase for provision of temp sine/cosine values based on the flag; and
a sine/cosine value generator selectively swapping or inverting the temp sine/cosine values as the sine/cosine values of the input phase based on an octant index indicating which octant the input phase actually locates;
wherein:
the phase projector further determines the octant index;
the phase projector further comprises:
a first acquiring unit acquiring the first 3 MSB bits of the input phase for output as the octant index;
a second acquiring unit acquiring the last N-3 LSB bits of the input phase;
a 2's complement code generator finding the 2's complement of the output of the second acquiring unit;
a selector selectively choosing the output of the second acquiring unit or the output of the 2's complement code generator as the octant phase based on the LSB bit of the octant index; and
a logic circuit generating the flag based on the octant phase and the LSB bit of the octant index.

2. The apparatus as claimed in claim 1, wherein the logic circuit further comprises:
a comparator determining whether or not all bits of the octant phase are logic 0; and
an AND gate pulling high the flag only if the LSB bit of the octant index is logic 1 and the output of the comparator indicates all bits of the octant phase are logic 0.

3. The apparatus as claimed in claim 1, wherein the LUT-arithmetic unit further comprises:
a ROM storing sine/cosine values of octant 0 and outputting the corresponding sine/cosine values of the octant phase.

4. The apparatus as claimed in claim 1, wherein the LUT-arithmetic unit further comprises:
a processor outputting the corresponding sine/cosine values of the octant phase using CORDIC iteration algorithm and based on a normalized phase, wherein the normalized phase is obtained by multiplying the octant phase by pi/4 and truncating the outcome to K bits.

5. The apparatus as claimed in claim 1, wherein the LUT-arithmetic unit further comprises:
a ROM storing sine/cosine values of octant 0 and outputting the sine/cosine values of the primary part of a normalized phase, wherein the normalized phase is obtained by multiplying the octant phase by pi/4 and truncating the outcome to K bits; and
a processor generating the sine/cosine values of the secondary part of the normalized phase using CORDIC iteration algorithm, and combining the sine/cosine values of the secondary part of the normalized phase with the sine/cosine values of the primary part of the normalized phase to output the corresponding sine/cosine values of the octant phase.

6. The apparatus as claimed in claim 1, wherein the temp sine/cosine generator further comprises:
a first selector choosing a constant value or the corresponding cosine value of the octant phase as the temp cosine value based on the flag; and
a second selector choosing the constant value or the corresponding sine value of the octant phase as the temp sine value based on the flag.

7. The apparatus as claimed in claim 6, wherein the temp sine/cosine generator further comprises:
a LUT outputting a swap index indicating whether or not corresponding sine/cosine values of the octant phase is required to swap or invert in the following sine/cosine value generator based on the octant index.

8. The apparatus as claimed in claim 1, wherein the sine/cosine value generator further comprises:
first-level selectors choosing the temp sine/cosine values or their 2's complements based on the octant index; and
second-level selectors choosing the outputs of the first-level selectors as the sine/cosine values of the input phase based on the octant index.

9. The apparatus as claimed in claim 7, wherein the sine/cosine value generator further comprises:
first-level selectors choosing the temp sine value or its 2's complements based on the second MSB bit of the swap index and choosing the temp cosine value or its 2's complements based on the MSB bit of the swap index; and second-level selectors selectively choosing the outputs of the first-level selectors as the sine or cosine values of the input phase based on the LSB of swap index.

* * * * *